United States Patent [19]

Scheuble et al.

[11] Patent Number: 4,818,428

[45] Date of Patent: Apr. 4, 1989

[54] LIQUID CRYSTAL PHASE

[75] Inventors: Bernhard Scheuble, Alsbach; Georg Weber, Erzhausen; Joachim Krause, Dieburg, all of Fed. Rep. of Germany

[73] Assignee: Merck Patent Gesellschaft mit beschrankter Haftung, Darmstadt, Fed. Rep. of Germany

[21] Appl. No.: 913,886

[22] PCT Filed: Dec. 20, 1985

[86] PCT No.: PCT/EP85/00733

§ 371 Date: Sep. 12, 1986

§ 102(e) Date: Sep. 12, 1986

[87] PCT Pub. No.: WO86/04081

PCT Pub. Date: Jul. 17, 1986

[30] Foreign Application Priority Data

Jan. 12, 1985 [DE] Fed. Rep. of Germany ....... 3500897

[51] Int. Cl.[4] .................... C09K 19/34; C09K 19/54; C09K 19/00; G02F 1/13
[52] U.S. Cl. .................... 252/299.1; 252/299.61; 252/299.5; 252/299.63; 252/299.67; 350/349; 350/350 R
[58] Field of Search ........... 252/299.5, 299.61, 299.63, 252/299.64, 299.65, 299.66, 299.67, 299.68, 299.1; 350/350 R, 349

[56] References Cited

U.S. PATENT DOCUMENTS

| | | |
|---|---|---|
| 4,198,312 | 4/1980 | Sato et al. ................... 252/299.67 |
| 4,323,471 | 4/1982 | Sethofer ...................... 252/299.61 |
| 4,372,871 | 2/1983 | Tongama et al. ............. 252/299.61 |
| 4,391,730 | 7/1983 | Kuschel et al. .............. 252/299.61 |
| 4,455,261 | 6/1984 | Sasaki et al. ................. 252/299.67 |
| 4,490,276 | 12/1984 | Hsu ............................. 252/299.61 |
| 4,551,264 | 11/1985 | Eidenschink et al. ........ 252/299.61 |
| 4,551,280 | 11/1985 | Sasaki et al. ................. 252/299.63 |
| 4,559,161 | 12/1985 | Takei et al. .................. 252/299.63 |
| 4,609,256 | 9/1986 | Nakamura .................... 252/299.63 |
| 4,643,841 | 2/1987 | Ishii et al. .................... 252/299.61 |
| 4,659,502 | 4/1987 | Fearon et al. ................ 252/299.61 |
| 4,670,182 | 6/1987 | Fujita et al. .................. 252/299.61 |
| 4,673,756 | 6/1987 | Sasaki et al. ................. 252/299.5 |
| 4,709,030 | 11/1987 | Petrzilka et al. ............. 252/299.61 |
| 4,722,804 | 2/1988 | Ishii et al. .................... 252/299.61 |

FOREIGN PATENT DOCUMENTS

| | | |
|---|---|---|
| 56501 | 7/1982 | European Pat. Off. ....... 252/299.61 |
| 151446 | 8/1985 | European Pat. Off. ....... 252/299.61 |
| 167912 | 1/1986 | European Pat. Off. ....... 252/299.63 |
| 174541 | 3/1986 | European Pat. Off. ....... 252/299.61 |
| 232052 | 8/1987 | European Pat. Off. ....... 252/299.61 |
| 3315295 | 10/1984 | Fed. Rep. of Germany ........................ 252/299.61 |
| 3404116 | 8/1985 | Fed. Rep. of Germany ........................ 252/299.61 |
| 60-101183 | 6/1985 | Japan ............................ 252/299.61 |
| 60-192786 | 10/1985 | Japan ............................ 252/299.61 |
| 86/05799 | 10/1986 | PCT Int'l Appl. ............ 252/299.61 |
| 2067586 | 7/1981 | United Kingdom .......... 252/299.61 |
| 2092169 | 8/1982 | United Kingdom .......... 252/299.61 |

*Primary Examiner*—Teddy S. Gron
*Assistant Examiner*—J. E. Thomas
*Attorney, Agent, or Firm*—Millen & White

[57] ABSTRACT

The invention relates to liquid crystal phases (LC phases) having a particularly low threshold voltage, a particularly low ratio $K_3/K_1$ of the elastic constants for bending ($K_3$) and spreading ($K_1$) and broad nematic phase ranges, these phases containing at the same time at least one highly polar component of reduced degree of association and, to reduce the quotient $K_3/K_1$ of the elastic constants for bending ($K_3$) and spreading ($K_1$) of the phases to a value $\leq 1.1$, at least one apolar liquid crystal component.

18 Claims, No Drawings

LIQUID CRYSTAL PHASE

The invention relates to liquid crystal phases (LC phases) having a particularly low threshold voltage, a particularly low ratio $K_3/K_1$ of the elastic constants for bending ($K_3$) and spreading ($K_1$) and broad nematic phase ranges.

Liquid crystal display elements (LC display elements) increasingly utilize the properties of nematic or nematic-cholesteric liquid crystal materials of significantly changing their optical properties such as light absorption, light scattering, birefringence, reflectance or colour under the influence of electric fields. The function of such display elements is based for example on the phenomena of dynamic scattering, the deformation of aligned phases, the guest-host effect, the Schadt-Helfrich effect in the twisted cell, or the cholesteric-nematic phase transition.

The industrial application of these effects in electronic components requires liquid crystal phases which must meet a large number of requirements. Of particular importance here are the chemical resistance to moisture, air and physical factors such as heat, radiation in the infrared, visible and ultraviolet region and continuous and alternating electric fields. Industrially utilizable liquid crystal phases are also required to have a liquid crystal mesophase within a suitable temperature range, a very low viscosity, a relatively low optical anisotropy, a high steepness of the electro-optical characteristic and adequate dissolving power for pleochroic dyes. Finally, they must not have any self-absorption in the region of visible light, i.e. they must be colourless.

None of the hitherto disclosed series of compounds with a liquid crystal mesophase contain an individual compound which meets all these requirements. For that reason, mixtures of two to twenty-five, preferably three to fifteen, compounds are generally prepared in order to obtain substances which are usable as liquid crystal phases. Usually at least one compound having a low melting and clear point is mixed with at least one compound having a higher clear point. The result is normally a mixture whose melting point is below that of the lower-melting component, while the clear point is between the clear points of the components. However, optimal phases cannot be easily prepared in this way, since the components having the high melting and clear points frequently also confer on the mixtures a high viscosity. As a result the switching times of the electro-optical display elements prepared therewith are changed in an undesirable manner.

To reduce the threshold voltage, hitherto disclosed LC phases have added to them strongly polar nematic compounds having a terminal cyano group. The effective dipole moment of these compounds, however, is distinctly reduced by a more or less strong antiparallel association of these molecules, so that relatively large amounts of polar compounds need to be added. This in turn gives rise to various disadvantages, such as unfavorable elastic properties of the LC phases, and high viscosity. On addition of 4-cyano-3-fluorophenyl p-alkylbenzoates as strongly polar components of ZLI-1975/5 (commercially available mixture from E. Merck, Darmstadt, containing phenylcyclohexane, cyclohexylbiphenyl, bis-cyclohexylbiphenyl compounds and phenyl cyclohexylbenzoates), it has been possible to show (Hp. Schad and S. M. Kelley, J. Chem. Phys. 81 (3), 1514-15 (1984)) that the threshold voltage is reduced, which is explained in terms of a reduced degree of association of the added compounds. However, even these LC phases do not meet all the abovementioned requirements at the ame time. In particular, for many applications their threshold voltages are still too high, and, in addition, the steepnesses of the characteristic are not sufficient for highly informative displays owing to the relatively large ratio of the elastic constants for bending ($K_3$) and spreading ($K_1$) $K_3/K_1$. The hitherto disclosed mixtures therefore have an excessively high threshold voltage and/or an unacceptable poor steepness of characteristic (characterized by an excessively high $K_3/K_1$). Furthermore, hitherto disclosed mixtures with a low threshold voltage have excessively high smectic-nematic transition temperatures.

There is thus still a great need for liquid crystal phases having high clear points, low melting points, a low viscosity (and hence short switching times) and a low threshold voltage, which at the same time have favorable elastic properties.

Tha invention has for its object to prepare liquid crystal phases which have a nematic phase within the required temperature range and are completely or almost completely free from the abovementioned disadvantages.

It has now been found that liquid crystal phases having particularly favorable combinations of material properties, in particular broad mesophase ranges, and extraordinarily low threshold voltage and particularly favorable elastic properties, are obtained when they contain at the same time at least one highly polar component of reduced degree of association and, to reduce the quotient $K_3/K_1$ of the elastic constants for bending ($K_3$) and spreading ($K_1$) of the phase to a value $\leq 1.1$, at least one apolar liquid crystal component.

Compounds of reduced degree of association are to be understood here as meaning liquid crystal compounds which, while having a similar total dipole moment of the molecule (from vector addition of the individual dipole moments of the structure elements), have, through reduced antiparallel association of the molecular compounds, a higher dielectric anistropy than, for example, compounds such as 4-alkyl-4'-cyanobiphenyls or p-trans-4-alkylcyclohexylbenzonitriles.

Particularly favorable properties are displayed by liquid crystal phases having at least one component of the formula I $$R^1-(A^1-Z^1)_m-A^2-Z^2-A^3 \qquad \text{I}$$

in which $R^1$ is alkyl of 1 to 12 C atoms, in which in addition one or two non-adjacent $CH_3$ groups can be replaced by O atoms, —CO—, —O—CO—, —CO—O— and/or —CH=CH— groups, $A^1$ and $A^2$ are each 1,4-phenylene, in which in addition 1 to 4 CH groups can be replaced by N, or 1,4-cyclohexylene, in which in addition one or two non-adjacent $CH_2$ groups can be replaced by O, $Z^1$ is —CO—O—, —O—CO—, —CH$_2$—O—, —OCH$_2$—, —CH$_2$CH$_2$—, —CH=N—, —N=CH—, —N=NO—, —NO=N— or a single bond, $Z^2$ is —CO—O—, —O—CO—, —CH$_2$O—, —OCH$_2$—, —CH$_2$CH$_2$— or a single bond, m is 0, 1 or 2 and $A^3$ is 3-halogeno-4-cyanophenyl or 3,5-dihalogeno-4-cyanophenyl.

$R^1$ is preferably straight-chain alkyl or alkoxy of 1 to 7 C atoms.

$A^1$ and $A^2$ are preferably each, independently of each other, 1,4-phenylene, 1,4-cyclohexylene, 1,3-dioxane-2,5-diyl or pyrimidine-2,5-diyl, in particular 1,3-dioxane-2,5-diyl or pyrimidine-2,5-diyl, where, however, only one of the groups $A^1$ and $A^2$ is 1,3-dioxane-2,5-diyl or pyrimidine-2,5-diyl.

Preference is also given to compounds of the formula I in which $A^1$ and $A^2$ are 1,4-cyclohexylene and $Z^2$ is a single bond or —CO—O—.

$Z^1$ is preferably a single bond.

$Z^2$ is preferably —CO—O—, —CH$_2$CH$_2$—, —CH$_2$O— or a single bond, in particular —CO—O— or a single bond.

m is preferably 0 or 1.

Halogen in $A^3$ is preferably chlorine or fluorine, in particular preferably fluorine.

The LC phases according to the invention preferably having a quotient $K_3/K_1 \leq 1.0$ and a threshold voltage $\leq 1.5$ volt, particularly preferably a quotient $K_3/K_1 \leq 0.9$ and a threshold voltage $\leq 1.4$ volt, particularly preferably $\leq 1.2$ volt. Preferred LC phases according to the invention have no smectic phase ranges to $-20°$ C., particularly preferably to $-30°$ C.

The invention thus provides the above-described liquid crystal phases which may also contain one or more pleochroic dyes (guest-host systems), and the use of these phases in liquid crystal display elements.

The invention further provides liquid crystal display elements, in particular electro-optical display elements which contain such phases.

The guest-host systems according to the invention generally contain 0.1 to 15, preferably 0.5 to 10, in particular 1 to 7, percent by weight of pleochroic dyes.

The pleochroic dyes of the guest-host system according to the invention are preferably chosen in such a way that they cover a suitable part of the visible spectrum and that the absorption in this range is more or less constant.

The preparation of the guest-host systems according to the invention is effected in conventional manner. In general, the desired amounts of the various pleochroic dyes are dissolved in the host material, preferably at elevated temperature.

However, it is also possible to mix solutions of the pleochroic dye and of the host material in a suitable organic solvent, for example acetone, chloroform or methanol, and to remove the solvent after thorough mixing, for example by distillation under reduced pressure. It is self-evident that with this method it is necessary to ensure that the solvent does not introduce any contaminants or undesirable dopants.

The individual compounds of the formula I and the apolar components of the liquid crystal phases according to the invention are either known or preparable by methods which are easily derivable by those skilled in the art from the prior art, since they are based on standard methods described in the literature.

Corresponding compounds of the formula I are described for example in German Patent Application Nos. P 34 05 914, P 34 01 320, P 34 11 571 and P 33 15 295; in German Offenlegungsschrift No. 32 09 178; in European Patent Specification No. 0,019,665; in S. M. Kelly and Hp. Schad, Helvetica Chimica Acta, 67, 1580–1587 (1984); in S. M. Kelly, ibid., 67, 1572–1579 (1984); and also in European Offenlegungsschriften Nos. 0,099,099 and 0,119,756 and in Japanese Offenlegungsschrift No. 59-191,789. Corresponding apolar liquid crystal components are described for example in German Patent Application Nos. P 33 15 295, P 33 46 175, P 34 01 320, P 34 01 321, P 34 04 116, P 34 11 571; in German Offenlegungsschriften Nos. 21 67 252, 22 57 588, 24 29 093, 25 47 737, 26 41 724, 29 44 905, 29 51 099, 31 40 868, 32 28 350; in European Offenlegungsschriften Nos. 0,014,885, 0,084,194, 0,104,011, 0111,695, 0,122,389, 0,126,883 and in Japanese Offenlegungsschrift No. 59-98,065.

It was found, surprisingly, that the combination according to the invention of compounds of the formulae I and II gives LC phases which on the one hand have broad mesophase ranges with low melting points and low smectic-nematic transition temperatures and on the other are characterized, combined with remarkably low threshold voltages, by particularly favorable ratios $K_3/K_1$ of the elastic constants for bending ($K_3$) and spreading ($K_1$).

The LC phases according to the invention preferably contain at least five components, particularly preferably at least three components, of the formula I and/or at least two components, preferably at least four components, in particular at least six, apolar components.

The total proportion of the compounds of the formula I and the apolar components in the LC phases according to the invention is preferably at least 45%, in particular at least 50%.

The proportion of the compounds of the formula I is preferably at least 18%, and particularly preferably within the range from 18 to 73%. The proportion of the apolar components is preferably at least 27%, particularly preferably at least 32%.

Preferred compounds of the formula I are those of the partial formulae Ia to Iu:

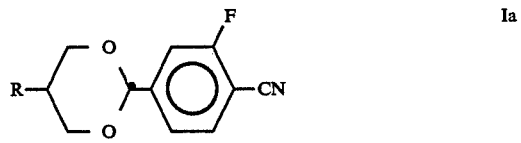

Ia

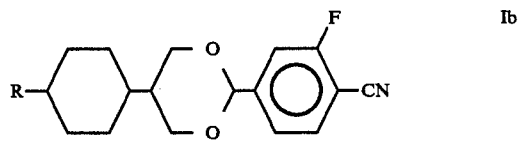

Ib

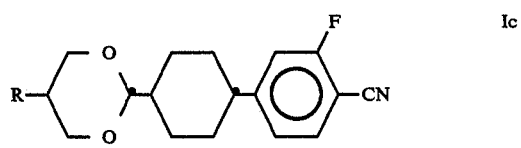

Ic

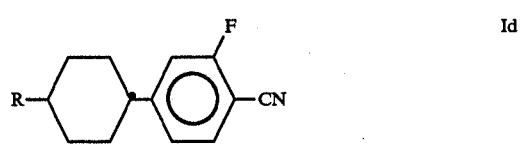

Id

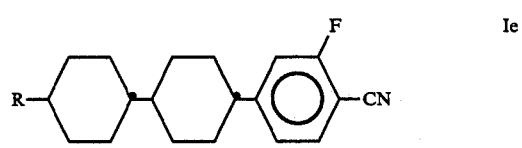

Ie

 If

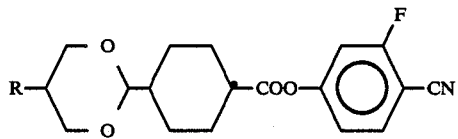 Ig

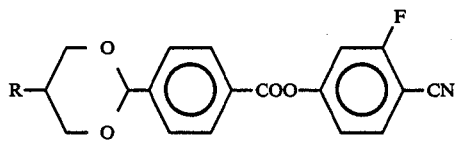 Ih

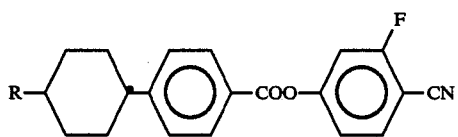 Ii

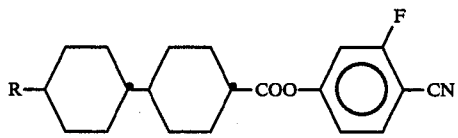 Ij

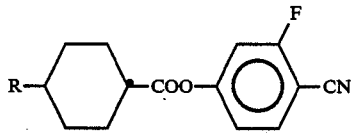 Ik

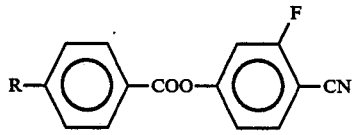 Il

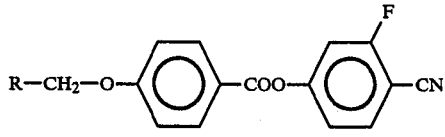 Im

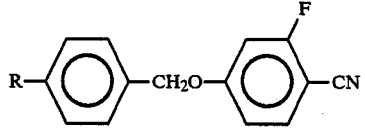 In

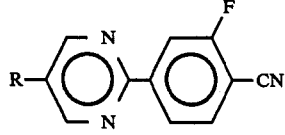 Io

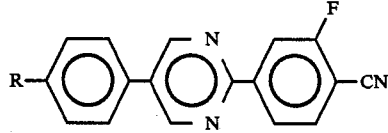 Ip

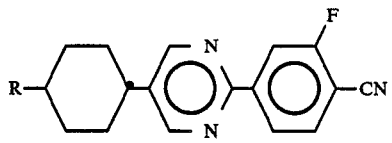 Iq

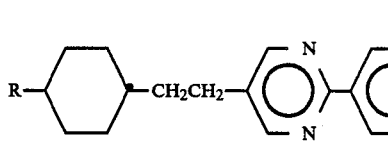 Ir

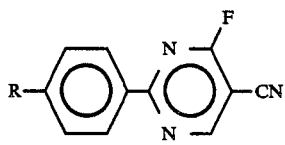 Is

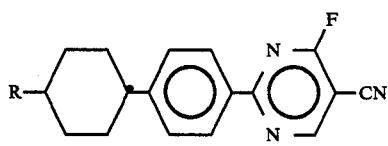 It

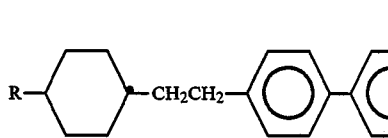 Iu

Preference is likewise given to the o-chlorobenzonitrile which correspond to the foregoing o-fluorobenzonitrile compounds, in particular those of the formula Id, I3, Ii, Il, Im and In.

Of the foregoing partial formalae, those of the formulae Ia, Ib, Id, Ie, Ig, Ih, Ik, Il, Im and Is are preferred. Particular preference is given to those of the partial formulae Ia, Ib, Ig, Ih, Im and Is.

Preferred LC phases according to the invention contain at least one, preferably at least two, compounds of the formula I, in which m=0 and at the same time at least one compound of the formula I, in which m=1.

The apolar liquid crystal components of the LC phases according to the invention preferably have a dielectric anisotropy within the range from −2 to +2, in particular within the range from −1.5 to +1.

It is possible to use for example compounds of the formulae A to G in which alkyl and alkoxy

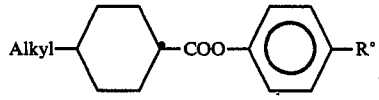 A

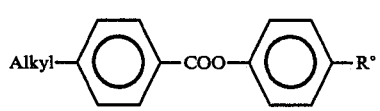 B

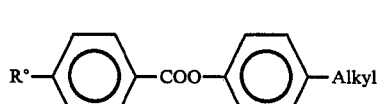 C

-continued

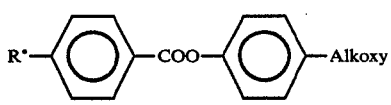

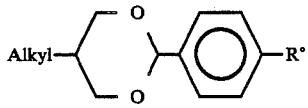

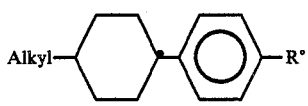

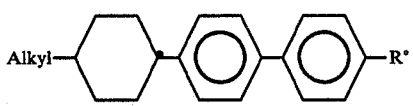

are each a straight-chain alkyl or alkoxy group of 1 to 7 C atoms and $R^o$ is a straight-chain alkyl or alkoxy group or an oxaalkyl or alkenyl group of 1 to 7 C atoms.

Particular preference is given to those compounds of the formulae A, C, E, F and G, in particular to those in which $R^o$ is alkoxy. However, preferably the apolar components are nitrogen-containing liquid crystal compounds.

The nitrogen-containing liquid crystal components of the LC phases according to the invention are liquid crystal compounds which contain at least one of the structure elements (1) to (4)

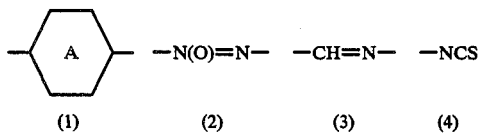

where the ring A is 1,4-phenylene, 2,6-disubstituted naphthalene, -di- or -tetrahydronaphthalene in which in each case at least one, preferably two, CH groups have been replaced by N.

A is preferably a group selected from the formulae (5) to (12).

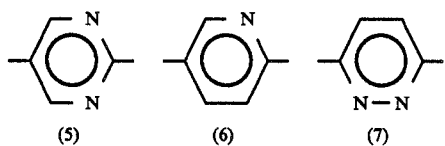

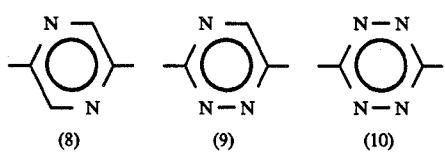

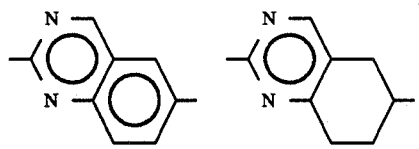

Preference is given to groups of the formula (5), (6), (7) and (12), in particular (5).

In this context "nitrogen-containing components" is not to be understood as meaning liquid crystal compounds having nitrile wing groups (lateral nitrile groups).

Important such nitrogen-containing components can be characterized by the formula II $$R'-X-Y-Z-R'' \qquad \text{II}$$

in which X and Z are each a carbocyclic or heterocyclic ring system from the group comprising 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| Y | —CH=CH— | —N(O)=N— |
|---|---|---|
|   | —CH=CQ— | —CH=N(O)— |
|   | —C≡C— | —CH₂—CH₂— |
|   | —CO—O— | —CH₂—O— |
|   | —CO—S— | —CH₂—S— |
|   | —CH=N— | —COO—Phe—COO— | or a C—C single bond, Q is halogen, preferably chlorine, or —CN, and R' and R" are alkyl, alkoxy, alkanoyloxy or alkoxycarbonyloxy of up to 18, preferably up to 8, carbon atoms or one of these radicals is also CN, NC, NO₂, CF₃, F, Cl or Br, where at least one of the groups X and Z is 2,5-disubstituted pyrimidine, quinazoline or tetrahydroquinazoline and/or Y is —CH=N— or —N(O)=N—.

Particularly preferred nitrogen-containing components are those of the partial formulae IIa and IIt,

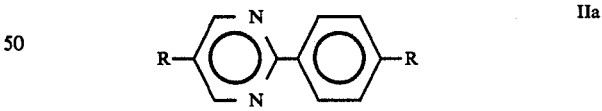

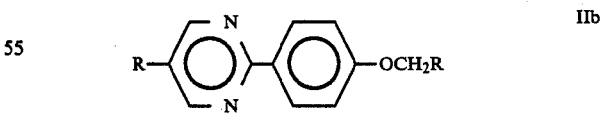

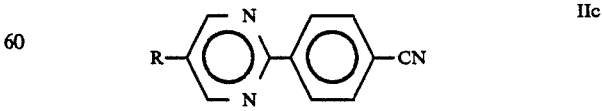

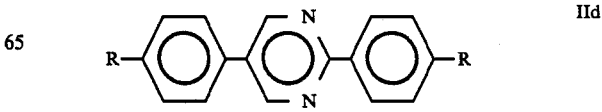

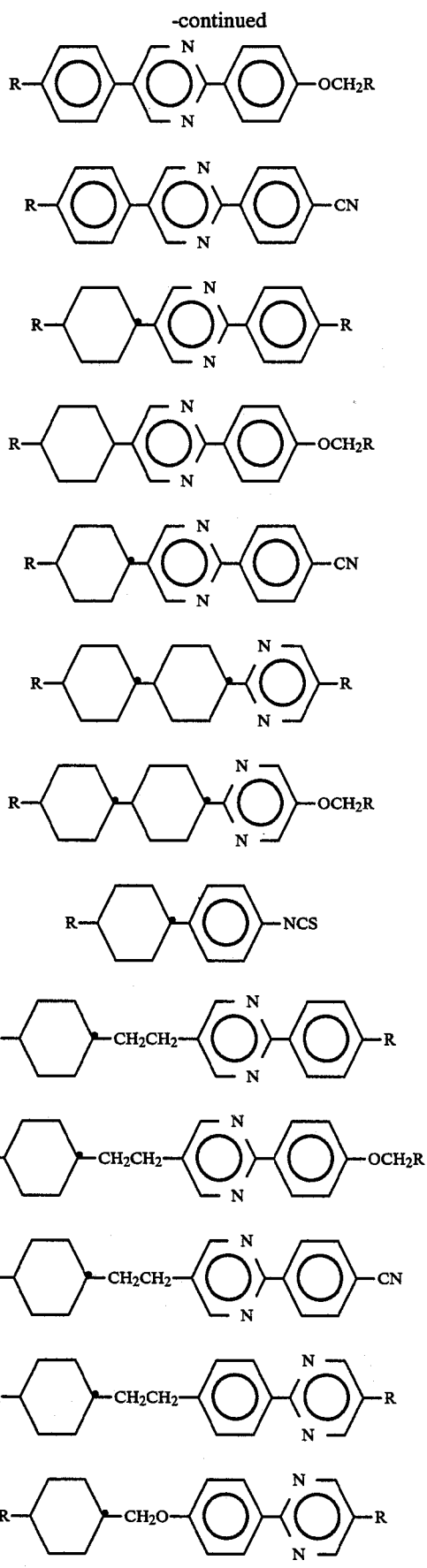

and those pyrimidine derivatives of the partial formulae Io, Ip, Iq, Ir, Is and It.

Of the foregoing partial formulae, those of the formulae IIb, IIc, IIe, IIf, IIh, IIi, IIj, IIl and IIr and preferred. Those of the formula IIb are particularly preferred.

Particularly preferred LC phases according to the invention are those containing compounds of the partial formulae Io, Ip, Iq, Ir, Is and/or It. These compounds with very favorable quotients $K_3/K_1$ are at the same time highly polar components of reduced degree of association. The nitrogen-containing liquid crystal components in LC phases according to this invention can thus be identical to the highly polar compounds of reduced degree of association, in which case the LC phase according to the invention then contains at least two such compounds.

In the compounds of the foregoing and following formulae, Cy is trans-1,4-cyclohexylene and Ph is 1,4-phenylene.

Suitable for use as further components of the LC phases according to the inention are, in addition to the compounds of the formula I and II, compounds of the formula III $$R^1\text{—(Cy)}_r\text{—(Ph)}_s\text{—}Z^3\text{—Ph—CN} \quad \text{III}$$

in which
r is 0, 1 or 2,
s is 0 or 1,
r+s is 1 or 2,
$Z^3$ is —CO—O— or a single bond, and
$R^1$, Cy and Ph have the abovementioned meanings, and/or compounds of the formula IV $$R^1\text{—(Cy)}_r\text{—}Z^4\text{—(Ph)}_t\text{—}Z^5\text{—(Cy)}_s\text{—}R^2 \quad \text{IV}$$

in which
t is 0, 1 or 2,
r+s+t is 2, 3 or 4,
$ZZ^4$ and $Z^5$ are each —CO—O—, —O—CO—, —CH$_2$CH$_2$— or a single bond and $R^2$ has one of the meanings of $R^1$, and
$R^1$, Cy, Phe, r and s have the abovementioned meaning.

Preferred compounds of the formula III are those of the partial formulae IIIa to IIIh:

| | |
|---|---|
| R—Ph—Ph—CN | IIIa |
| RCH$_2$O—Ph—Ph—CN | IIIb |
| R—Cy—Ph—CN | IIIc |

R—Cy—Ph—Ph—CN   IIId
R—Cy—Cy—Ph—CN   IIIe
R—Ph—COO—Ph—CN   IIIf
R—Cy—COO—Ph—CN   IIIg
R—Cy—Ph—COO—Ph—CN   IIIh

Preferred compounds of the formula IV are those of the partial formula IVa to IVj:

$$R-Cy-Ph\overset{F}{-}Ph-R \quad IVe$$

R—Cy—Ph—Ph—Cy—R   IVf $$R-Cy-Ph\overset{F}{-}Ph-Cy-R \quad IVg$$

R—Cy—Cy—COO—Cy—R   IVh
R—Cy—Cy—CH$_2$CH$_2$—Cy—R   IVi
R—Cy—Ph—Ph—CH$_2$CH$_2$—Cy—R   IVj
R—Cy—Ph—R   IVa
R—Cy—Ph—OCH$_2$R   IVb
R—Cy—Ph—Ph—R   IVc
R—Cy—Ph—Ph—OCH$_2$R   IVd

Of the foregoing partial formulae those of the formulae IVb, IVe, IVf, IVg, IVh and IVi are preferred. Particularly preference is given to those of the partial formulae IVe, IVf, IVg, IVh and IVi.

Also preferred are liquid crystal phases according to the invention which contain phenyldioxane compounds. Such compounds are described in German Offenlegungsschrift No. 29 44 905. 2-p-Cyanophenyl-5-n-alkyl-1,3-dioxanes are particularly preferred.

In the case of the compounds of the foregoing partial formulae, R is a straight-chain alkyl group, preferably of 1 to 7 C atoms (in the case of the nitrogen-containing components, the compounds of the formula II and also their partial formulae preferably of 2 to 10 C atoms), in which in addition a CH$_2$ group can also be replaced by —O— or —CH=CH—. Particularly preferred groups R are methyl, ethyl, n-propyl, n-butyl, n-pentyl, n-hexyl and n-heptyl, methoxy, ethoxy, n-propoxy, n-butoxy, n-pentoxy, n-hexoxy, n-heptoxy, n-octoxy, n-nonoxy and n-decoxy.

In the case of the compounds of the foregoing partial formulae with two groups R, both groups R each have independently of each other one of the abovementioned meanings.

When the alkyl groups contain 3 or more carbon atoms, these can be arranged in a straight or branched chain. However, the phases according to the invention do not use any components which contain more than one branched alkyl group. Such branched alkyl groups for the purposes of the present invention contain not more than one chain branching; preferably this is a methyl or ethyl group in the 1- or 2-position of the carbon skeleton, so that suitable branched alkyl groups are in particular: 2-methylpropyl, 2-methylbutyl, 1-methylpentyl, 2-methylpentyl, 1-methylhexyl. Generally the liquid crystal dielectrics according to the invention have only one component having a branched-chain alkyl radical in order to induce, if desired, optical activity. For this purpose, normally not more than 10 percent by weight, preferably 0.5 to 3 percent by weight, of a component having a branched alkyl radical are added.

In the compounds of the foregoing partial formulae,

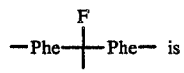

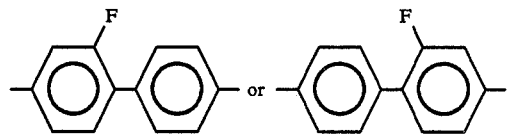

The LC phases according to the invention preferably do not contain compounds of the formulae III and IV at the same time.

The preparation of the phases according to the invention is effected in conventional manner. In general, the desired amount of the components which are used in smaller amounts is dissolved in the components which constitute the main constituent, preferably at elevated temperature. If this temperature is chosen to be above the clear point of the main constituent, the completeness of the process of dissolving can be observed particularly easily.

By means of suitable additives, the liquid crystal phases according to the invention can be modified in such a way that they can be used in any hitherto disclosed kind of liquid crystal display element.

Such additives are known to those skilled in the art and are exhaustively described in the literature. It is possible to add for example conducting salts, preferably ethyldimethyldodecylammonium 4-hexyloxybenzoate, tetrabutylammonium tetraphenylboranate or complex salts of crown ethers (cf. for example I. Haller et al., Mol. Cryst. Liq. Cryst. volume 24, pages 249–258, (1973)) for improving the conductivity or substances for modifying the dielectric anisotropy, the viscosity and/or the orientation of the nematic phases. Such substances are described for example in German Offenlegungsschriften Nos. 22 09 127, 22 40 864, 23 21 632, 23 28 281, 24 50 088, 26 37 430, 28 53 728 and 29 07 177.

The examples below serve to illustrate the invention without limiting it. In the examples, the melting point and clear point of a liquid crystal substance are given in degrees celsius. The percentages are by weight. The values of the threshold voltage relate to an angle of observation of 0°, 10% contrast and 20° C.

EXAMPLE 1

A liquid crystal phase consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 4-cyano-3-fluorophenyl p-trans-4-propylcyclohexyl benzoate,
5% of 4-cyano-3-fluorophenyl p-ethylbenzoate,
5% of 4-cyano-3-fluorophenyl p-propylbenzoate,
7% of 2-p-pentyloxyphenyl-5-hexylpyrimidine,
7% of 2-p-hexyloxyphenyl-5-hexylpyrimidine,
7% of 2-p-heptyloxyphenyl-5-hexylpyrimidine,
6% of 2-p-nonyloxyphenyl-5-hexylpyrimidine, 20% of p-trans-4-propylcyclohexylphenyl butyrate,
6% of 4-(trans-4-pentylcyclohexyl)-4'-(trans-4-propylcyclohexyl)-2-fluorobiphenyl and
5% of 4,4'-bis-(trans-4-pentylcyclohexyl)-2-fluorobiphenyl has a melting point of −9°, up to −30° no smectic phase, a clear point of 68°, a quotient $K_3/K_1$ of 0.88 at 20° and a threshold voltage of 1.4 volt.

EXAMPLE 2

A liquid crystals phase consisting of
12% of 2-(4-cyano-3-fluorophenyl)-5-propylpyrimidine,
12% of 2-(4-cyano-3-fluorophenyl)-5-butylpyrimidine,
10% of 2-(4-cyano-3-fluorophenyl)-5-pentylpyrimidine,
8% of 4-cyano-3-fluorophenyl p-trans-4-propylcyclohexyl benzoate,
5% of 4-cyano-3-fluorophenyl p-ethylbenzoate,
5% of 4-cyano-3-fluorophenyl p-propylbenzoate,
7% of 2-p-pentyloxyphenyl-5-hexylpyrimidine,
7% of 2-p-hexyloxyphenyl-5-hexylpyrimidine,
7% of 2-heptyloxyphenyl-5-hexylpyrimidine,
6% of 2-p-nonyloxyphenyl-5-hexylpyrimidine,
10% of p-trans-4-propylcyclohexylphenyl butyrate,
6% of 4-(trans-4-pentylcyclohexyl)-4'-(trans-4-propylcyclohexyl)-2-fluorobiphenyl and
5% of 4,4'-bis-(trans-4-pentylcyclohexyl)-2-fluorobiphenyl has a threshold voltage of 1.15 V and a quotient $K_3/K_1$ of 0.80 at 20°.

EXAMPLE 3

A liquid crystal phase consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 4-cyano-3-fluorophenyl p-trans-4-propylcyclohexyl benzoate,
5% of 4-cyano-3-fluorophenyl p-ethylbenzoate,
5% of 4-cyano-3-fluorophenyl p-propylbenzoate,
5% of 2-p-pentyloxyphenyl-5-hexylpyrimidine,
6% of 2-p-hexyloxyphenyl-5-hexylpyrimidine,
6% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
17% of p-trans-4-propylcyclohexylphenyl butyrate,
5% of 4-(trans-4-pentylcyclohexyl)-4'-(trans-4-propylcyclohexyl)-2-fluorobiphenyl and
4% of 4,4'-bis-(trans-4-pentylcyclohexyl)-2-fluorobiphenyl has a melting point of −9°, to −30° no smectic phase, a clear point of 65°, a quotient $K_3/K_1$ of 0.83 at 20° and a threshold voltage of 1.4 volt.

EXAMPLE 4

A liquid crystal phase conisisting of
12% of 2-(4-cyano-3-fluorophenyl)-5-propyl-1,3-dioxane,
11% of 2-(4-cyano-3-fluorophenyl)-5-butyl-1,3-dioxane,
10% of 2-(4-cyano-3-fluorophenyl)-5-pentyl-1,3-dioxane,
8% of 4-cyano-3-fluorophenyl p-trans-4-propylcyclohexyl benzoate,
5% of 4-cyano-3-fluorophenyl p-ethylbenzoate,
5% of 4-cyano-3-fluorophenyl p-propylbenzoate,
5% of 2-p-pentyloxyphenyl-5-hexylpyrimidine,
6% of 2-p-hexyloxyphenyl-5-hexylpyrimidine,
6% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
8% of p-trans-4-propylcyclohexylphenyl butyrate,
5% of 4-(trans-4-pentylcyclohexyl)-4'-(trans-4-propylcyclohexyl)-2-fluorobiphenyl and
4% of 4,4'-bis-(trans-4-pentylcyclohexyl)-2-fluorobiphenyl has a threshold voltage of 1.25 volt and a quotient $K_3/K_1$ of 0.85 at 20°.

EXAMPLE 5

A liquid crystal phase consisting of
12% of 2-(4-cyano-3-fluorophenyl)-5-propylpyrimidine,
11% of 2-(4-cyano-3-fluorophenyl)-5-butylpyrimidine,
10% of 2-(4-cyano-3-fluorophenyl)-5-pentylpyrimidine,
8% of 4-cyano-3-fluorophenyl p-trans-4-propylcyclohexylbenzoate,
5% of 4-cyano-3-fluorophenyl p-ethylbenzoate,
5% of 4-cyano-3-fluorophenyl p-propylbenzoate,
5% of 2-p-pentyloxyphenyl-5-hexylpyrimidine,
6% of 2-p-hexyloxyphenyl-5-hexylpyrimidine,
6% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
8% of 2-(4-cyano-3-fluorophenyl)-5-(p-pentylphenyl)-pyrimidine,
5% of 4-(trans-4-pentylcyclohexyl)-4'-(trans-4-propylcyclohexyl)-2-fluorobiphenyl and
4% of 4,4'-bis-(trans-4-pentylcyclohexyl)-2-fluorobiphenyl has a threshold voltage of 1.10 volt and a quotient $K_3/K_1$ of 0.78 at 20°.

EXAMPLE 6

A liquid crystal phase consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 4-cyano-4-fluorophenyl p-(5-propyl-1,3-dioxan-2-yl)-benzoate,
5% of 4-cyano-3-fluorophenyl p-ethoxybenzoate,
5% of 4-cyano-3-fluorophenyl p-pentyloxybenzoate,
7% of 2-p-pentyloxyphenyl-5-hexylpyrimidine,
7% of 2-p-hexyloxyphenyl-5-hexylpyrimidine,
7% of 2-p-heptyloxyphenyl-5-hexylpyrimidine,
7% of 2-p-nonyloxyphenyl-5-hexylpyrimidine,
20% of p-trans-4-propylcyclohexylphenyl butyrate
6% of 4-(trans-4-pentylcyclohexyl)-4'-(trans-4-propylcyclohexyl)-2-fluorobiphenyl and
5% of 4,4'-bis-(trans-4-pentylcyclohexyl)-2-fluorobiphenyl has a threshold voltage of 1.45 volt and a quotient $K_3/K_1$ of 0.92 at 20°.

EXAMPLE 7

A liquid crystal phase consisting of
9% of 2-(p-propylphenyl)-4-fluoro-5-cyanopyrimidine,
9% of 2-(p-pentylphenyl)-4-fluoro-5-cyanopyrimidine,
7% of 4-cyano-3-fluorophenyl p-(5-propyl-1,3-dioxan-2-yl)-benzoate,
8% of 4-cyano-3-fluorophenyl p-propoxybenzoate,
8% of 4-cyano-3-fluorophenyl p-pentyloxybenzoate,
5% of 2-p-methoxyphenyl-5-hexylpyrimidine,
5% of 2-p-heptyloxyphenyl-5-hexylpyrimidine, 5% of 2-p-methoxyphenyl-5-heptylpyrimidine,
5% of 2-p-heptyloxyphenyl-5-heptylpyrimidine,
5% of 2-p-nonyloxyphenyl-5-heptylpyrimidine,
17% of trans-1-p-propylphenyl-4-pentylcyclohexane,
6% of 4-(trans-4-pentylcyclohexyl)-4'-(trans-4-propylcyclohexyl)-2-fluorobiphenyl,
6% of 4,4'-bis-(trans-4-pentylcyclohexyl)-2-fluorobiphenyl and
5% of 4,4'-bis-(trans-4-propylcyclohexyl)-2-fluorobiphenyl
has favorable properties.

EXAMPLE 8

A liquid crystal phase consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 4'-[2-(trans-4-propylcyclohexyl)-ethyl]-3-fluoro-4-cyanobiphenyl,
5% of 4-cyano-3-fluorophenyl p-ethoxybenzoate,
5% of 4-cyano-4-fluorophenyl p-propoxybenzoate,
5% of 2-p-pentyloxyphenyl-5-hexylpyrimidine,
6% of 2-p-hexyloxyphenyl-5-hexylpyrimidine,
6% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
17% of p-trans-4-propylcyclohexylphenyl butyrate,
5% of 4-(trans-4-pentylcyclohexyl)-4'-(trans-4-propylcyclohexyl)-2-fluorobiphenyl and
4% of 4,4'-bis-(trans-4-pentylcyclohexyl)-2-fluorobiphenyl
has a threshold voltage of 1.45 volt and a quotient $K_3/K_1$ of 0.87 at 20°.

EXAMPLE 9

A liquid crystal phase consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 2-(4-cyano-3-fluorophenyl)-5-[2-(trans-4-propylcyclohexyl)-ethyl]-pyrimidine,
5% of 4-cyano-3-fluorophenyl p-ethoxybenzoate,
5% of 4-cyano-3-fluorophenyl p-propoxybenzoate,
5% of 2-p-pentyloxyphenyl-5-hexylpyrimidine,
6% of 2-p-hexyloxyphenyl-5-hexylpyrimidine,
6% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
17% of p-trans-4-propylcyclohexylphenyl butyrate,
5% of 4-(trans-4-pentylcyclohexyl)-4'-(trans-4-propylcyclohexyl)-2-fluorobiphenyl and
4% of 4,4'-bis-(trans-4-pentylcyclohexyl)-2-fluorobiphenyl
has a threshold voltage of 1.4 volt and a quotient $K_3/K_1$ of 0.85 at 20°.

EXAMPLE 10

A liquid crystal phase consisting of
6% of 2-(4-cyano-3-fluorophenyl)-5-propyl-1,3-dioxane,
6% of 2-(4-cyano-3-fluorophenyl)-5-butyl-1,3-dioxane,
7% of 2-(4-cyano-3-fluorophenyl)-5-pentyl-1,3-dioxane,
8% of 2-(4-cyano-3-fluorophenyl)-5-[2-(trans-4-propylcyclohexyl)-ethyl]-pyrimidine,
7% of 4-cyano-3-fluorophenyl p-ethoxybenzoate,
7% of 4-cyano-3-fluorophenyl p-propoxybenzoate,
6% of 2-p-pentyloxyphenyl-5-hexylpyrimidine,
6% of 2-p-heptyloxyphenyl-5-hexylpyrimidine,
6% of 2-p-heptyloxyphenyl-5-heptylpyrimidin,
6% of 2-p-nonyloxyphenyl-5-heptylpyrimidine,
5% of 2-p-pentyloxyphenyl-5-p-pentylphenylpyrimidine,
5% of 2-p-heptyloxyphenyl-5-p-pentylphenylpyrimidine,
15% of trans-1-p-propylphenyl-4-pentylcyclohexane,
5% of 4-(trans-4-pentylcyclohexyl)-4'-(trans-4-propylcyclohexyl)-2-fluorobiphenyl and
5% of 4,4'-bis-(trans-4-pentylcyclohexyl)-2-fluorobiphenyl
has favorable properties.

EXAMPLE 11

A liquid crystal phase is prepared consisting of
8% of 2-(4-cyano-3-fluorophenyl)-5-propylpyrimidine,
9% of 2-(4-cyano-3-fluorophenyl)-5-butylpyrimidine,
8% of 2-(4-cyano-3-fluorophenyl)-5-pentylpyrimidine,
10% of 4'-[2-(trans-4-ethylcyclohexyl)-ethyl]-3-fluoro-4-cyanobiphenyl,
7% of 4-cyano-3-fluorophenyl p-ethoxybenzoate,
8% of 4-cyano-3-fluorophenyl p-propoxybenzoate,
8% of 4-cyano-3-fluorophenyl p-butoxybenzoate,
7% of 2-(4-cyano-3-fluorophenyl)-5-[2-(trans-4-propylcyclohexyl)-ethyl]-pyrimidine,
12% of p-trans-4-propylcyclohexylphenyl butyrate,
7% of p-trans-4-pentylcyclohexylphenyl butyrate,
6% of 4,4'-bis-(trans-4-propylcyclohexyl)-2-fluorobiphenyl,
5% of 4,4'-biS-(trans-4-pentylcyclohexyl)-2-fluorobiphenyl,
5% of 4-(trans-4-pentylcyclohexyl)-4'-(trans-4-propylcyclohexyl)-2-fluorobiphenyl.

EXAMPLE 12

A liquid crystal phase is prepared consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 4-cyano-3-fluorophenyl p-trans-4-propylcyclohexyl benzoate,
5% of 4-cyano-3-fluorophenyl p-ethylbenzoate,
5% of 4-cyano-3-fluorophenyl p-propylbenzoate,
7% of 2-p-pentyloxyphenyl-5-hexylpyrimidine,
7% of 2-p-hexyloxyphenyl-5-hexylpyrimidine,
7% of 2-p-heptyloxyphenyl-5-hexylpyrimidine,
6% of 2-p-nonyloxyphenyl-5-hexylpyrimidine,
10% of p-trans-4-propylcyclohexylphenyl butyrate,
6% of 4-(trans-4-pentylcyclohexyl)-4'-(trans-4-propylcyclohexyl)-2-fluorobiphenyl,
5% of 4,4'-bis-(trans-4-pentylcyclohexyl)-2-fluorobiphenyl and
10% of p-pentylphenyl p-methoxybenzoate.

EXAMPLE 13

A liquid crystal phase is prepared consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 4-cyano-3-fluorophenyl p-trans-4-propylcyclohexyl benzoate,
5% of 4-cyano-3-fluorophenyl p-ethylbenzoate,
5% of 4-cyano-3-fluorophenyl p-propylbenzoate,
7% of 2-p-pentyloxyphenyl-5-hexylpyrimidine,
7% of 2-p-hexyloxyphenyl-5-hexylpyrimidine,
7% of 2-p-heptyloxyphenyl-5-hexylpyrimidine, 6% of 2-p-nonyloxyphenyl-5-hexylpyrimidine,
10% of p-trans-4-propylcyclohexylphenyl butyrate,
6% of 4-(trans-4-pentylcyclohexyl)-4'-(trans-4-propylcyclohexyl)-2-fluorobiphenyl,
5% of 4,4'-bis-(trans-4-pentylcyclohexyl)-2-fluorobiphenyl and
10% of p-ethoxyphenyl trans-4-propylcyclohexanecarboxylate.

EXAMPLE 14

A liquid crystal phase is prepared consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 4-cyano-3-fluorophenyl p-trans-4-propylcyclohexyl benzoate,
5% of 4-cyano-3-fluorophenyl p-ethylbenzoate,
5% of 4-cyano-3-fluorophenyl p-propylbenzoate,
7% of 2-p-pentyloxyphenyl-5-hexylpyrimidine,
7% of 2-p-hexyloxyphenyl-5-hexylpyrimidine,
7% of 2-p-heptyloxyphenyl-5-hexylpyrimidine,
6% of 2-p-nonyloxyphenyl-5-hexylpyrimidine,
10% of p-trans-4-propylcyclohexylphenyl butyrate,
6% of 4-(trans-4-pentylcyclohexyl)-4'-(trans-4-propylcyclohexyl)-2-fluorobiphenyl,
5% of 4,4'-bis-(trans-4-pentylcyclohexyl)-2-fluorobiphenyl and
10% of p-methoxymethylphenyl trans-4-propylcyclohexanecarboxylate.

EXAMPLE 15

A liquid crystal phase is prepared consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 4-cyano-3-fluorophenyl p-trans-4-propylcyclohexyl benzoate,
5% of 4-cyano-3-fluorophenyl p-ethylbenzoate,
5% of 4-cyano-3-fluorophenyl p-propylbenzoate,
7% of 2-pentyloxyphenyl-5-hexylpyrimidine,
7% of 2-p-hexyloxyphenyl-5-hexylpyrimidine,
7% of 2-p-heptyloxyphenyl-5-hexylpyrimidine,
6% of 2-p-nonyloxyphenyl-5-hexylpyrimidine,
10% of p-trans-4-propylcyclohexylphenyl butyrate,
6% of 4-(trans-4-pentylcyclohexyl)-4'-(trans-4-propylcyclohexyl)-2-fluorobiphenyl,
5% of 4,4'-bis-(trans-4-pentylcyclohexyl)-2-fluorobiphenyl and
10% of 2-p-ethoxyphenyl-5-propyl-1,3-dioxane.

EXAMPLE 16

A liquid crystal phase is prepared consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 4-cyano-3-fluorophenyl p-trans-4-propylcyclohexylbenzoate,
5% of 4-cyano-3-fluorophenyl p-ethylbenzoate,
5% of 4-cyano-3-fluorophenyl p-propylbenozate,
7% of 2-p-pentyloxyphenyl-5-hexylpyrimidine,
7% of 2-p-hexyloxyphenyl-5-hexylpyrimidine,
7% of 2-p-heptyloxyphenyl-5-hexylpyrimidine,
6% of 2-p-nonyloxyphenyl-5-hexylpyrimidine,
10% of p-trans-4-propylcyclohexylphenyl butyrate,
6% of 4-(trans-4-pentylcyclohexyl)-4'-(trans-4-propylcyclohexyl)-2-fluorobiphenyl,
5% of 4,4'-bis-(trans-4-pentylcyclohexyl)-2-fluorobiphenyl and
10% of p-(trans-4-hex-3-enyl-cyclohexyl)-benzonitrile.

EXAMPLE 17

A liquid crystal phase is prepared consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 4-cyano-3-fluorophenyl p-trans-4-propylcyclohexyl benzoate,
5% of 4-cyano-3-fluorophenyl p-ethylbenzoate,
5% of 4-cyano-3-fluorophenyl p-propylbenzoate,
7% of 2-p-pentyloxyphenyl-5-hexylpyrimidine,
7% of 2-p-hexyloxyphenyl-5-hexylpyrimidine,
7% of 2-p-heptyloxyphenyl-5-hexylpyrimidine,
6% of 2-p-nonyloxyphenyl-5-hexylpyrimidine,
10% of p-trans-4-propylcyclohexylphenyl butyrate,
6% of 4-(trans-4-pentylcyclohexyl)-4'-(trans-4-propylcyclohexyl)-2-fluorobiphenyl,
5% of 4,4'-bis-(trans-4-pentylcyclohexyl)-2-fluorobiphenyl and
10% of p-(trans-4-pentylcyclohexyl)-phenyl isothiocyanate.

EXAMPLE 18

A liquid crystal phase consisting of
9% of 2-p-cyanophenyl-5-propyl-1,3-dioxane,
6% of 2-p-cyanophenyl-5-butyl-1,3-dioxane,
9% of 2-p-cyanophenyl-5-pentyl-1,3-dioxane,
5% of 4-cyano-3-fluorophenyl p-ethylbenzoate,
4% of 4-cyano-3-fluorophenyl p-propylbenzoate,
7% of 4-cyano-3-fluorophenyl p-pentylbenzoate,
5% of 2-p-pentyloxyphenyl-5-hexylpyrimidine,
5% of 2-p-hexyloxyphenyl-5-hexylpyrimidine,
5% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
15% of p-trans-4-propylcyclohexylphenyl butyrate,
4% of 4,4'-bis-(trans-4-propylcyclohexyl)-2-fluorobiphenyl,
4% of 4,4'-bis-(trans-4-pentylcyclohexyl)-2-fluorobiphenyl and
7% of 4-(trans-4-pentylcyclohexyl)-4'-(trans-4-propylcyclohexyl)-2-fluorobiphenyl
has a melting point of −9°, to −30° no smectic phase, a clear point of 65°, a quotient of $K_3/K_1$ of 0.84 at 20° and a threshold voltage of 1.4 volt.

EXAMPLE 19

A liquid crystal phase consisting of
6% of 2-p-cyanophenyl-5-propyl-1,3-dioxane,
10% of 2-cyanophenyl-5-butyl-1,3-dioxane,
8% of 2-p-cyanophenyl-5-pentyl-1,3-dioxane,
8% of 4-cyano-3-fluorophenyl p-(5-propyl-1,3-dioxan-2-yl)-benzoate,
5% of 4-cyano-3-fluorophenyl p-ethylbenzoate,
5% of 4-cyano-3-fluorophenyl p-propylbenzoate,
5% of 2-p-pentyloxyphenyl-5-hexylpyrimidine,
6% of 2-p-hexyloxyphenyl-5-hexylpyrimidine,
6% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
17% of p-trans-4-propylcyclohexylphenyl butyrate,
5% of 4-(trans-4-pentylcyclohexyl)-4'-(trans-4-propylcyclohexyl)-2-fluorobiphenyl and
4% of 4,4'-bis-(trans-4-pentylcyclohexyl)-2-fluorobiphenyl, has up to −20° no smectic phase, a quotient $K_3/K_1$ of 0.81 to 20° and a threshold voltage of 1.3 volt.

EXAMPLE 20

A liquid crystal phase is prepared consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 4-(trans-4-(trans-4-heptylcyclohexyl)-cyclohexyl)-2-fluorobenzonitrile,
5% of 4-cyano-3-fluorophenyl p-ethylbenzoate,
5% of 4-cyano-3-fluorophenyl p-propylbenzoate,
5% of 2-p-pentyloxyphenyl-5-hexylpyrimidine,
6% of 2-p-hexyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
17% of p-trans-4-propylcyclohexylphenyl butyrate,
5% of 4-(trans-4-pentylcyclohexyl)-4'-(trans-4-propylcyclohexyl)-2-fluorobiphenyl and
4% of 4,4'-bis-(trans-4-pentylcyclohexyl)-2-fluorobiphenyl.

EXAMPLE 21

A liquid crystal phase is prepared consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 4-cyano-3-fluorophenyl trans-4-(trans-4-pentylcyclohexyl)-cyclohexylanecarboxylate,
5% of 4-cyano-3-fluorophenyl p-ethylbenzoate,
5% of 4-cyano-3-fluorophenyl p-propylbenzoate,
5% of 2-p-pentyloxyphenyl-5-hexylpyrimidine,
6% of 2-p-hexyloxyphenyl-5-hexylpyrimidine,
6% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
17% of p-trans-4-propylcyclohexylphenyl butyrate,
5% of 4-(trans-4-pentylcyclohexyl)-4'-(trans-4-propylcyclohexyl)-2-fluorobiphenyl and
4% of 4,4'-bis-(trans-4-pentylcyclohexyl)-2-fluorobiphenyl.

EXAMPLE 22

A liquid crystal phase is prepared consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
4% of 2-(4-cyano-3-fluorophenyl)-5-(trans-4-pentylcyclohexyl)-pyrimidine,
4% of 4-(trans-4(trans-4-pentylcyclohexyl)-cyclohexyl)-2-chlorobenzonitrile,
8% of 4-cyano-3-fluorophenyl p-(5-propyl-1,3-dioxan-2-yl)benzoate,
5% of 4-cyano-3-fluorophenyl p-ethylbenzoate,
5% of 4-cyano-3-fluorophenyl p-propylbenzoate,
5% of 2-p-pentyloxyphenyl-5-hexylpyrimidine,
6% of 2-p-hexyloxyphenyl-5-hexylpyrimidine,
6% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
17% of p-trans-4-propylcyclohexylphenyl butyrate,
5% of 4-(trans-4-pentylcyclohexyl)-4'-(trans-4-propylcyclohexyl)-2-fluorobiphenyl and
4% of 4,4'-bis-(trans-4-pentylcyclohexyl)-2-fluorobiphenyl.

EXAMPLE 23

A liquid crystal phase consisting of
6% of 2-p-cyanophenyl-5-propyl-1,3-dioxane,
10% of 2-p-cyanophenyl-5-butyl-1,3-dioxane,
8% of 2-p-cyanophenyl-5-pentyl-1,3-dioxane,
8% of 4-cyano-3-fluorophenyl p-(trans-4-propylcyclohexyl)benzoate,
5% of 4-cyano-3-fluorophenyl p-ethylbenzoate,
5% of 4-cyano-3-fluorophenyl p-propylbenzoate,
5% of 2-p-pentyloxyphenyl-5-hexylpyrimidine,
6% of 2-p-hexyloxyphenyl-5-hexylpyrimidine,
6% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
17% of p-trans-4-propylcyclohexylphenyl butyrate,
5% of 4-(trans-4-pentylcyclohexyl)-4'-(trans-4-propylcyclohexyl)-2-fluorobiphenyl and
4% of 4,4'-bis-(trans-4-pentylcyclohexyl)-2-fluorobiphenyl
has up to −30° no smectic phase, a quotient $K_3/K_1$ of 0.83 to 20° and a threshold voltage of 1.4 volt.

We claim:

1. A liquid crystal phase having at least five liquid crystal components and a threshold voltage <1.6 volt, and containing at least 18% of a highly polar component of reduced degree of association and, effective to reduce the phase's quotient of $K_3/K_1$ of the elastic constant for bending ($K_3$) and spreading ($K_1$) to a value $\leq 1.1$, at least 27% of an apolar liquid crystal component having a dielectric anisotropy in the range from −2 to +2, wherein the highly polar component of reduced degree of association is at least one of the compounds:

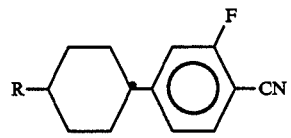

Id

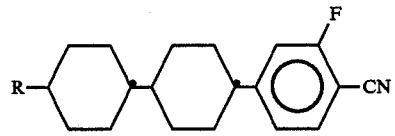

Ie

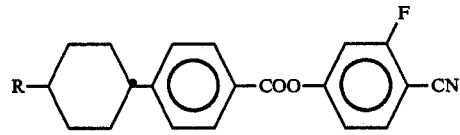

Ii

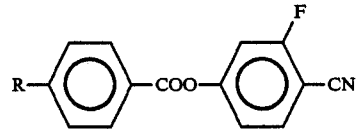

Il

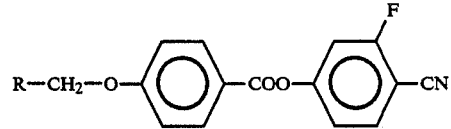

Im

-continued

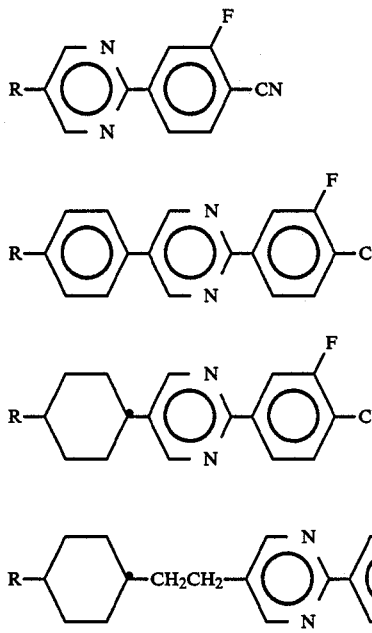

in which R is a straight-chain alkyl group of 1 to 7 C atoms and in which a CH₂ group can be replaced by —O— or —CH=CH—,
the apolar liquid crystal component is at least one of the compounds:

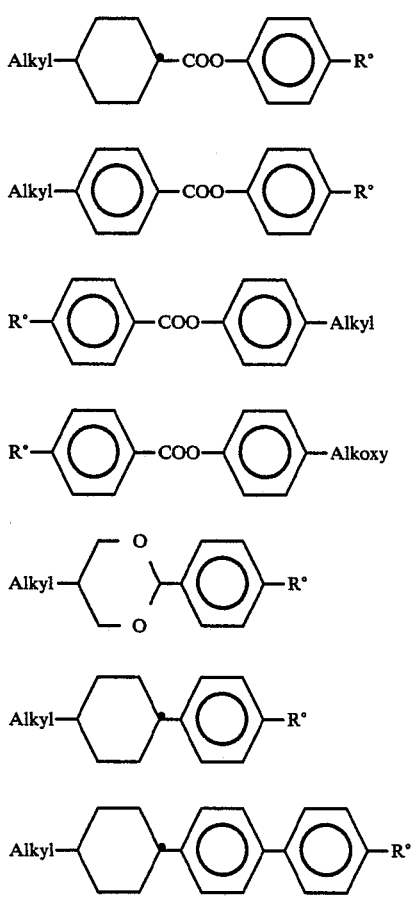

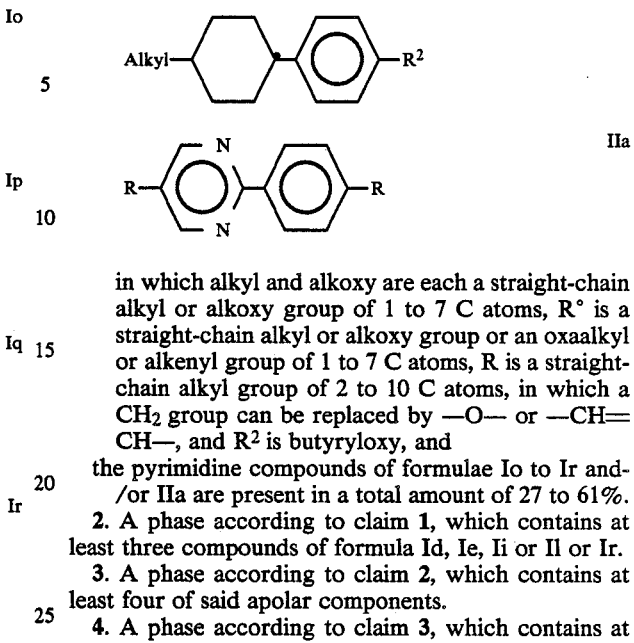

in which alkyl and alkoxy are each a straight-chain alkyl or alkoxy group of 1 to 7 C atoms, R° is a straight-chain alkyl or alkoxy group or an oxaalkyl or alkenyl group of 1 to 7 C atoms, R is a straight-chain alkyl group of 2 to 10 C atoms, in which a CH₂ group can be replaced by —O— or —CH=CH—, and R² is butyryloxy, and
the pyrimidine compounds of formulae Io to Ir and/or IIa are present in a total amount of 27 to 61%.

2. A phase according to claim 1, which contains at least three compounds of formula Id, Ie, Ii or Il or Ir.

3. A phase according to claim 2, which contains at least four of said apolar components.

4. A phase according to claim 3, which contains at least 32% of an apolar liquid crystal component.

5. A phase according to claim 1, which contains at least one compound of formula IIa.

6. A phase according to claim 1, which contains at least one compound of formula Io.

7. A phase according to claim 1, which contains at least one compound of the following formulas:

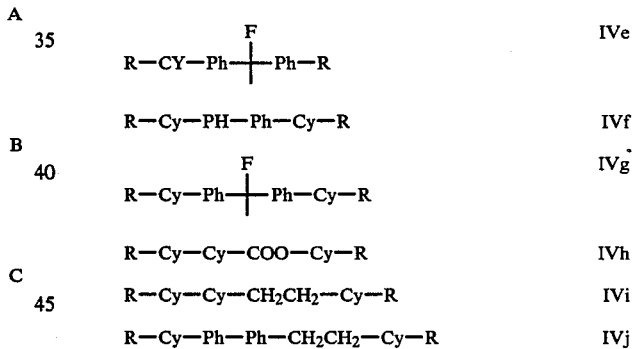

in which R is a straight-chain alkyl group of 1 to 7 C atoms, in which in addition a CH₂ group can also be replaced by —O— or —CH=CH—,

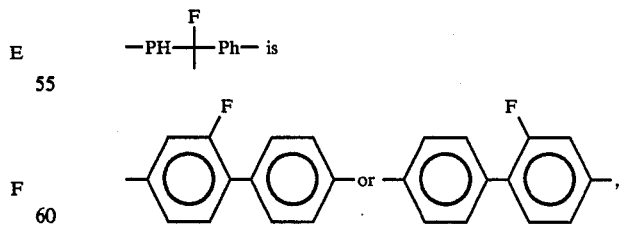

Cy is trans-1,4-cyclohexylene and Ph is 1,4-phenylene.

8. A phase according to claim 1, which contains at least one 2-p-cyanophenyl-5-n-alkyl-1,3-dioxane.

9. A phase according to claim 1, which has no smectic phase ranges to −20° C.

10. A phase according to claim 9, which has no smectic phase ranges to −30° C.

11. A phase according to claim 1, which has a threshold voltage $\leq 1.5$ volt.

12. A phase according to claim 1, which has a quotient $K_3/K_1 \leq 1.0$.

13. A phase according to claim 1, which has a quotient $K_3/K_1 \leq 0.9$ and a threshold voltage $\leq 1.4$ volt.

14. A phase according to claim 13, which has a threshold voltage $\leq \frac{1}{2}$ volt.

15. A phase according to claim 1, which contains one or more pleochroic dyes.

16. A phase according to claim 15, which contains 1 to 7% by weight of one or more pleochroic dyes.

17. A phase according to claim 1, wherein the total proportion of the higly polar component of reduced degree of association and of the apolar liquid crystal component as specified in claim 1 is at least 50%.

18. In an electro-optical display element comprising a liquid crystal phase, the improvement wherein the phase is one according to claim 1.

* * * * *